United States Patent
Shi et al.

(10) Patent No.: US 8,123,491 B2
(45) Date of Patent: Feb. 28, 2012

(54) METHODS AND SYSTEMS FOR ENERGY EXCHANGE

(75) Inventors: Ruijie Shi, Clifton Park, NY (US); Patrick Lazatin, Glenville, NY (US); Jeffrey David Erno, Clifton Park, NY (US); Daniel Jason Erno, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 598 days.

(21) Appl. No.: 12/361,647

(22) Filed: Jan. 29, 2009

(65) Prior Publication Data
US 2010/0187184 A1 Jul. 29, 2010

(51) Int. Cl.
*F04B 43/12* (2006.01)
(52) U.S. Cl. .......................................... 417/53
(58) Field of Classification Search .................... 417/53, 417/383, 394, 395; 210/652, 145.2, 137, 210/321.66
See application file for complete search history.

(56) References Cited

U.S. PATENT DOCUMENTS

| | | | |
|---|---|---|---|
| 3,039,733 | A | 6/1962 | Mattioli |
| 3,441,245 | A | 4/1969 | Holland et al. |
| 3,493,495 | A | 2/1970 | Mendelson |
| 3,791,768 | A | 2/1974 | Wanner |
| 4,410,429 | A | 10/1983 | Harvey et al. |
| 4,580,952 | A | 4/1986 | Eberle |
| 4,973,408 | A | 11/1990 | Keefer |
| 6,375,842 | B1 | 4/2002 | Graham |
| 6,447,259 | B2 | 9/2002 | Elliott-Moore |
| 6,468,431 | B1 | 10/2002 | Oklelas, Jr. |
| 6,547,965 | B1 | 4/2003 | Chancellor |

FOREIGN PATENT DOCUMENTS

| | | |
|---|---|---|
| EP | 0330891 B1 | 11/1992 |
| GB | 2363741 A | 1/2002 |
| GB | 2377928 A | 1/2003 |
| WO | WO2007096679 A1 | 8/2007 |
| WO | WO2008084118 A1 | 7/2008 |
| WO | WO2008121030 A2 | 10/2008 |
| WO | WO2009051474 A1 | 4/2009 |

OTHER PUBLICATIONS

PCT International Search Report dated Jun. 30, 2010 and PCT Written Opinion of the International Searching Authority.

*Primary Examiner* — Nimeshkumar Patel
*Assistant Examiner* — Donald Raleigh
(74) *Attorney, Agent, or Firm* — Mary Louise Gioeni

(57) ABSTRACT

Methods and systems for energy recovery in desalination or other systems are provided to transfer the pressure energy from one fluid to anther fluid. A system for energy recovery with a container comprises two sections separated by one or plurality of flexible impermeable diaphragms and pressures of the two fluids in the two sections are transmitted during the cyclical filling and pumping operations, as well as flow control valves. As one embodiment, two flexible impermeable tubes operable to receive two fluids of different pressures respectively connect to flow control valves. The first fluid and the second fluid are separated by the flexible impermeable diaphragm formed by the flexible tubes. Cyclical inflows of the two fluids transmit the higher pressure of one fluid to the other through the diaphragm and transfer the energy from one fluid to the other.

5 Claims, 6 Drawing Sheets

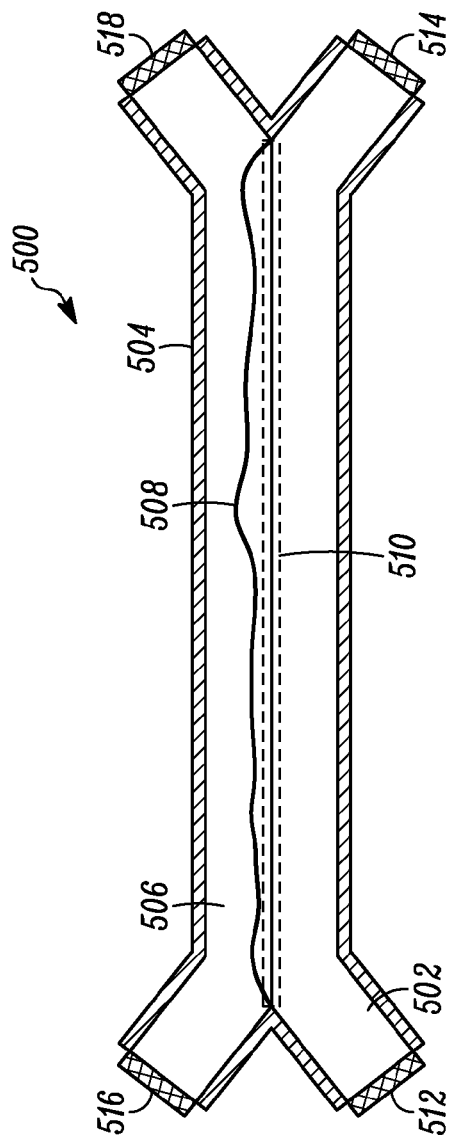
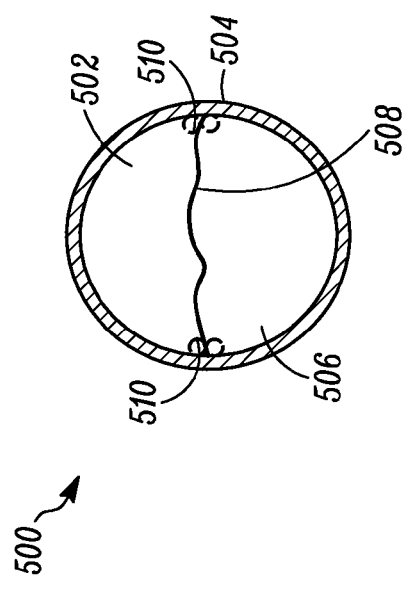
FIG. 5a
FIG. 5b

METHODS AND SYSTEMS FOR ENERGY EXCHANGE

FIELD OF THE INVENTION

The present invention relates generally to desalination systems and more specifically, to energy recovery systems used in desalination systems.

BACKGROUND OF THE INVENTION

Owing to the shortage of fresh water sources, sea-water or brackish water is being increasingly viewed around the world as a viable and long term source of fresh water. However, the saline nature of sea-water renders it unfit for use as fresh water. Thus different desalination techniques, such as reverse osmosis have been used to desalinate sea-water in significant quantities in order to provide pure drinking water in large. In reverse osmosis, the water to be desalinated is forced through a semi-permeable membrane so that the dissolved solids are removed by the membrane.

Reverse osmosis is similar to a filtration process in which sea-water is pumped in under high pressure through a membrane that retains the concentrated solute, such as dissolved salt ions on one side and allows the pure solvent, such as fresh water to pass to the other side. The fresh water leaves the membrane under relatively low pressure while the concentrated solvent containing the dissolved solutes leaves the membrane under high pressure, but some bit lower than the pressure of the sea-water supplied to the membrane. The concentrated solvent is then discharged into the sea, leading to wastage of the energy latent in the concentrated solvent in the form of pressure energy. Thus the desalination process has been found to be inefficient with high energy costs.

Thus, different means have been employed to recover the energy latent in the concentrated solvent. Some of the already proposed energy recovery schemes for the recovery of the otherwise lost energy use water turbines with high cost. Alternatively, many energy recovery schemes have proposed the use of reciprocating pistons for reducing the energy required to pump in the sea-water to high pressure for a reverse osmosis unit. However the use of reciprocating pistons places extra energy demands on the system. Moreover, a further disadvantage of the use of reciprocating pistons is that some energy may be lost in overcoming the friction generated during the action of the pistons.

Accordingly, there is a need for improved systems and methods for recovering energy from the concentrated solvent in order to increase the efficiency of the desalination process.

BRIEF DESCRIPTION OF THE INVENTION

According to one embodiment of the invention, there is disclosed a system comprising a container which includes a first section for receiving a first fluid, and a second section for receiving a second fluid. A flexible impermeable diaphragm sealed between the first section and the second section may be operable to transmit pressure between the first fluid and the second fluid. The system may include a set of check valves operable to control an inflow and outflow of the first fluid for the first section, and also a set of flow regulation valves operable to control an inflow and outflow of the second fluid for the second section.

According to one embodiment of the invention, there is disclosed a system comprising a container comprising a first flexible impermeable tube operable to receive a first fluid and a second flexible impermeable tube operable to receive a second fluid. The first flexible tube may connect to a set of check valves operable to control an inflow and outflow of the first fluid in the first flexible tube. Additionally, the second flexible tube may connect to a set of flow regulation valves operable to control an inflow and outflow of the second fluid in the second flexible tube. The first flexible tube and the second flexible tube are in contact with each other in the container, or may be further separated by at least one flexible impermeable diaphragm sealed between the first flexible tube and the second flexible tube, where the flexible impermeable tube wall or the diaphragm may be operable to transmit pressure between the first flexible tube and the second flexible tube.

According to one embodiment of the invention, there is disclosed a method for exchange of pressure energy between two fluids. The method may involve receiving a first fluid in a first section and a second fluid in a second section, wherein the first section and the second section may be separated by at least one flexible impermeable tube wall or diaphragm, and wherein the second fluid may be at a higher pressure than the first fluid. The method may further involve utilizing the higher pressure of the second fluid to expel the first fluid at an increased pressure out from the first section. The method may subsequently involve feeding additional first fluid in the first section, wherein the pressure of the additional first fluid accepted in the first section may be utilized to expel the second fluid from the second section when the second fluid is controlled to be of low pressure via the regulation valve. The method further may further involve maintaining a continual flow of the first fluid and the second fluid by repeating the above process cyclically with correct coordination.

Other embodiments, aspects, features, and advantages of the invention will become apparent to those skilled in the art from the following detailed description, the accompanying drawings, and the appended claims.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5a is a sectional view and FIG. 5b is a cross-sectional view of one example energy recovery system, in accordance with an illustrative embodiment of the invention.

DETAILED DESCRIPTION OF THE INVENTION

Illustrative embodiments of the invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are methods and systems for energy recovery in desalination systems. Various embodiments of the invention may include an energy recovery system comprising a container which includes a first section operable to receive a first fluid at low pressure, and a second section operable to receive a second fluid at high pressure. The fluids in the first section and the second section may be separated by at least one moveable flexible impermeable diaphragm positioned between the two sections. In certain embodiments of the invention, the first section may include a first set of check valves operable to control an inflow and outflow of the first fluid in the first section while the second section may include a second set of flow regulation valves operable to control an inflow and outflow of the second fluid in the second section. During a filling operation, the plurality of valves in combination may be operable to fill the first section of the energy recovery system with the first fluid. Subsequently, during a pumping operation, the plurality of valves in another combination may be operable to receive the second fluid in the second section which may lead to the compression of the first liquid through the impermeable diaphragm, and consequently the evacuation of the first liquid from the first section at high pressure. In the next cycle, the first fluid may be received in the first section during the filling operation.

Figure 1:
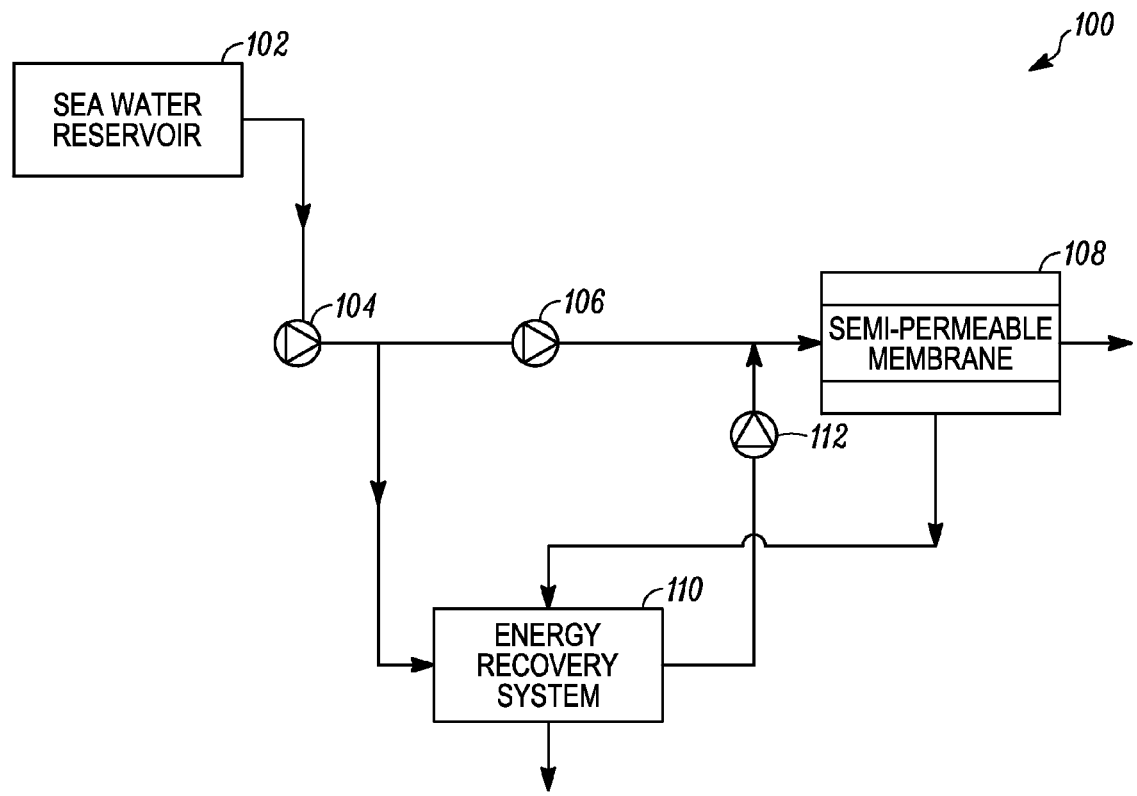
FIG. 1 is a schematic representation of one example seawater desalination system.

FIG. 1 is a schematic representation of one example seawater desalination system 100. In the example embodiment shown in the FIG. 1, the desalination system 100 may use a reverse osmosis process to filter the sea-water. As shown in the FIG. 1, a sea-water reservoir 102 provides sea-water to a feed pump 104. A portion of the sea-water received by the feed pump 104 may be pumped to a higher pressure by a high pressure pump 106 into a reverse osmosis (RO) unit 108, while the remaining sea-water received from the water reservoir 102 may be provided to an energy recovery system 110 at a low pressure. Subsequently, the sea-water provided to the RO unit 108 at high pressure may be filtered, and the byproduct of the filtration process, a concentrated brine solution at high osmotic pressure, may be discharged to the energy recovery system 110. Thus, the energy recovery system 110 may receive low pressure sea water from the feed pump 104 along with high pressure concentrated brine solution from the RO unit 108. One of the outputs of the energy recovery system 110 may be high pressure sea-water, whose pressure may be further increased by a low pressure head pump 112 to compensate for the friction loss in the loop. This flow combines with the direct flow from the high pressure pump 106, and is provided to the RO unit 108 to be filtered. Thus, use of the energy recovery system 110 reduces the amount of low pressure sea-water flowing through the high pressure pump 106, and thus increases the efficiency of the desalination system 100.

The various modes of operation of the energy recovery system 110 along with different example embodiments will now be fully described with references to FIGS. 2-6.

Figure 2:
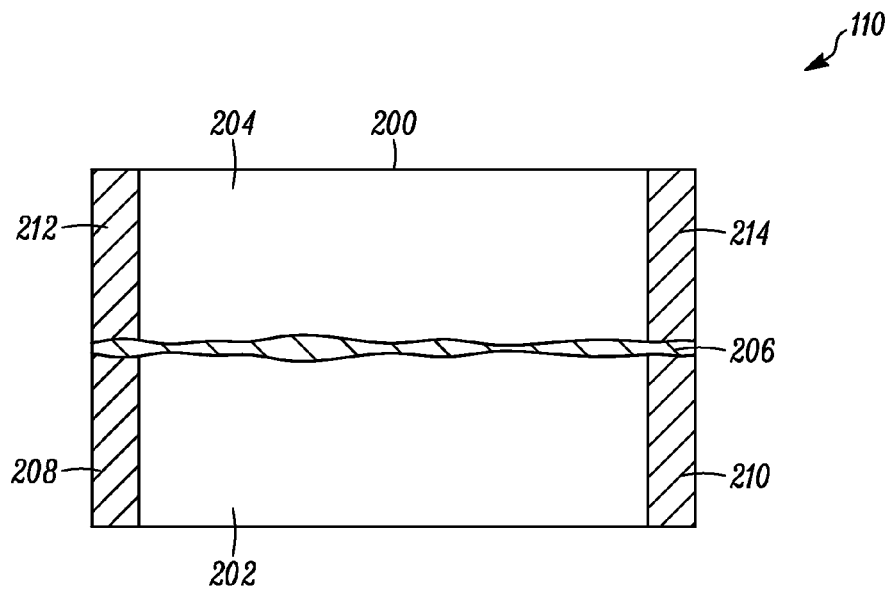
FIG. 2 is a sectional view of one example energy recovery system, in accordance with an illustrative embodiment of the invention.

FIG. 2 is a sectional view of one example energy recovery system 110, in accordance with an illustrative embodiment of the invention. The energy recovery system 110 as shown in the FIG. 1 may include a container 200, such as a pressure vessel of any desired shape and dimension. The container 200 may include a first section 202, and a second section 204 separated by at least one flexible impermeable diaphragm 206. The first section 202 accepts a first fluid at a first pressure and the second section 204 accepts a second fluid at a second pressure, where the second pressure may be higher than the first pressure. In one example embodiment, the first fluid received by the first section 202 may be low pressure seawater from a feed pump 104 while the second fluid received by the second section 204 may be high pressure concentrated brine solution from the reverse osmosis unit 108 (as shown in FIG. 1). The flexible impermeable diaphragm 206 separates the first section 202 and the second section 204, and thus prevents the mixing of the first and the second fluid. The flexible impermeable diaphragm 206 further transmits pressure energy between the first fluid and the second fluid. In certain embodiments of the invention, the flexible impermeable diaphragm 206 may be a thin flexible sheet sealed at the ends of the first section 202 and the second section 204 and may be moveable under the pressure of the first and the second fluid. Thus the moveable flexible impermeable diaphragm 206 positioned between the first section 202 and the second section 204 allows the volume of the first section 202 and the second section 204 to vary during filling and draining of one of the sections of the energy recovery system 110, however at the same time keeping the total volume of the container 200 constant.

Further, the energy recovery system 110 includes a set of check valves (or other flow regulation valves) 208 and 210 in the first section 202 to control an inflow and outflow of the first fluid in the first section 202. Additionally, the energy recovery system 110 also includes a set of flow regulation valves 212 and 214 in the second section 204 to control an inflow and outflow of the second fluid in the second section 204.

In one example embodiment, the pumping operation (hereinafter also referred to as high pressure operation) of the energy recovery system 110 may involve the valves 208 and 214 in a closed state while the valves 210 and 212 in an open state. During the high pressure operation of the energy recovery system 110, the high pressure concentrated brine solution flows into the second section 204 through the flow regulation valve 212 and exerts the high pressure on the diaphragm 206, and therefore also on the fluid in the section 202, thus squeezing the diaphragm 206 towards the section 202 in the process. Consequently, the diaphragm 206 moves in the energy recovery system 100 to transmit the pressure exerted by the high pressure brine solution onto the low pressure sea-water in the first section 202, and thereby push out the sea-water from the first section 202 through the check valve 210.

A subsequent discharge operation (hereinafter referred to as low pressure operation) of the energy recovery system 110 may involve the valves 208 and 214 in an open state (valve 214 connects to very low discharge pressure during this operation) while the valves 210 and 212 may remain closed. The low pressure operation leads to the inflow of low pressure fresh sea-water into the first section 202 through the check valve 208 to replenish the sea-water discharged from the first section 202 during the high pressure operation. Further, the pressure of the first section 202 increases due to the incoming flow of fresh sea-water from the feed pump 104 through the check valve 208. Thus, the increase in the pressure of the first section 202 due to the fresh sea-water coming in forces the brine solution out through the flow regulation valve 214. Subsequently, the entire cycle involving the high pressure operation and the low pressure operation is repeated with the high pressure operations and the low pressure operations occurring cyclically. Thus, the high osmotic pressure in the brine solution is used by the energy recovery system 110 to pump the fresh sea-water at a higher pressure into the RO unit 106. Two or more units may be used and operated coordinately to keep continuous flow and system operation.

FIG. 3 is a sectional view of one example energy recovery system 300, in accordance with another illustrative embodiment of the invention. The energy recovery system 300 shown in FIG. 3 includes a sieved tube 302 substantially enclosed inside a pressure vessel 304 of any desired dimension. In certain embodiments of the invention, the sieved tube 302 and the pressure vessel 304 may have circular cross-section, and may be aligned concentric to each other, thus enclosing a substantial part of the sieved tube 302 inside the pressure vessel 304. Additionally, the tubular sieved tube 302 may receive a first fluid, such as sea-water at low pressure, and the pressure vessel 304 may receive a second fluid, such as concentrated brine solution at high pressure. Further, a thin flexible tubular film 306 is positioned between the sieved tube 302 and the pressure vessel 304. The thin tubular film 306 prevents the first and second fluids from mixing. The thin tubular film 306 may be sealed at the end points between the sieved tube 302 and the pressure vessel 304 and may move in and out under the pressure of the first and the second fluid. The thin tubular film 306 surrounding the sieved tube 302 may further transmit pressure energy between the high pressure brine solution and the sea-water thereby achieving energy recovery from the concentrated brine solution.

The tube 302 is sieved to prevent the tubular thin film 306 from getting completely squeezed or getting over stressed by the flow dragging force, and at the same time to allow the sea-water in the sieved tube 302 to exchange pressure energy with the brine solution in the pressure vessel 304. Sieved section of the tube 302 does not affect the basic function of the unit. Moreover, the sieved tube 302 may be optimally sized to minimize the losses that may occur due to fluid flowing through the holes of the sieved tube 302. The optimal sizing of the sieved tube 302 may involve optimizing number of holes, diameter of the holes and the position of the holes along the sieved tube 302 in order to minimize the losses. In certain example embodiments, the thin tubular film 306 may be made of plastics or elastic polymers, such as rubber.

Further, the tubular sieved tube 302 may include a first set of valves to control the inflow and outflow of the first fluid inside the sieved tube 302, while the pressure vessel 304 may include a second set of valves to control the inflow and outflow of the second fluid inside the pressure vessel 304. In certain embodiments of the invention, the first set of valves may include at least one low pressure check valve 308 to control the inflow of the low pressure sea-water into the sieved tube 302, and at least one high pressure check valve 310 to control the outflow of the high pressure sea-water from the sieved tube 302. Additionally, the second set of valves may include at least one high pressure flow regulation valve 312 to control the inflow of the high pressure brine solution into the pressure vessel 304, and at least one low pressure flow regulation valve 314 to control the outflow of the low pressure brine solution from the pressure vessel 304. In certain embodiments of the invention, the first fluid and the second fluid may flow in opposite directions. Moreover, during the operation of the energy recovery system 300, the plurality of valves 308-314 may be suitably opened or closed in pairs to perform energy exchange between the high pressure brine solution and the low pressure sea-water.

During normal operation of the energy recovery system 300, the thin tubular film 306 does not slide against the walls of the pressure vessel 302 and may not touch the walls if the entire volume of the sections is not actively used in the operation, thus leaving out some dead volume. Thus any losses due to friction are eliminated. This ensures less wear and tear and minimizes frequent replacement of the thin tubular film 306. Moreover, the energy recovery system 300 with fewer moving sections than conventional energy recovery systems may result in greater reliability. Additionally, the absence of any rotating section in the energy recovery system 300 eliminates the problem of system failure due to fouling. Further, the design of the energy recovery system 300 allows no change in the flow direction of either of the two fluids along the length of the energy recovery system 300, thus reducing water hammer and minimizing losses.

In an alternate additional embodiment, the tube 302 may be a non-porous flexible tube of variable volume. Thus the thin tubular film 306 may be operable to transmit the pressure energy between the high pressure brine solution and the sea-water through the flexible tube 302, and thereby achieve energy recovery from the concentrated brine solution with minimum losses.

Figure 3A:
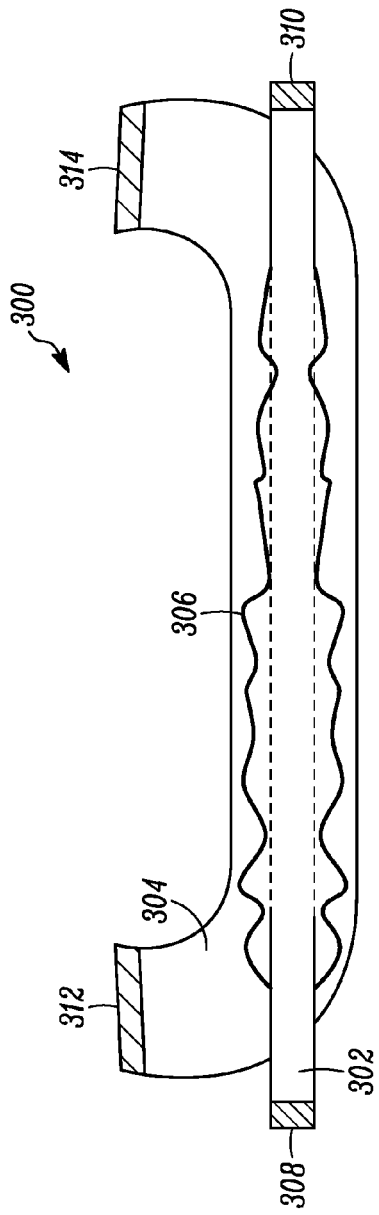
FIG. 3a is a sectional view and FIG. 3b is a cross-sectional view of one example energy recovery system, in accordance with another illustrative embodiment of the invention.
Figure 3B:
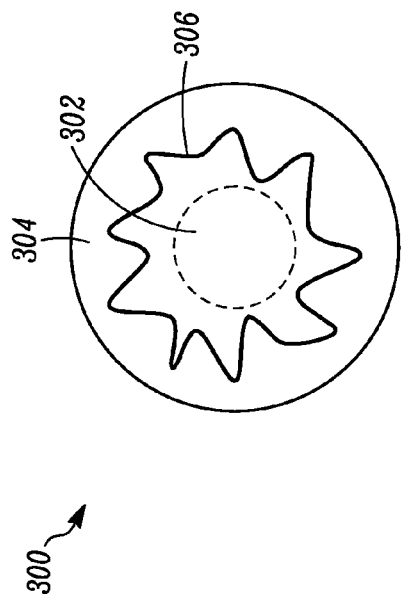

FIG. 3b illustrates a cross-sectional view of the example energy recovery system 300, in accordance with the embodiment illustrated in FIG. 3a. The cross-sectional view of the example energy recovery system 300 shows the tubular sieved tube 302 and the pressure vessel 304 arranged concentric to each other, with the thin tubular film 306 positioned between the sieved tube 302 and the pressure vessel 304.

Figure 4A:
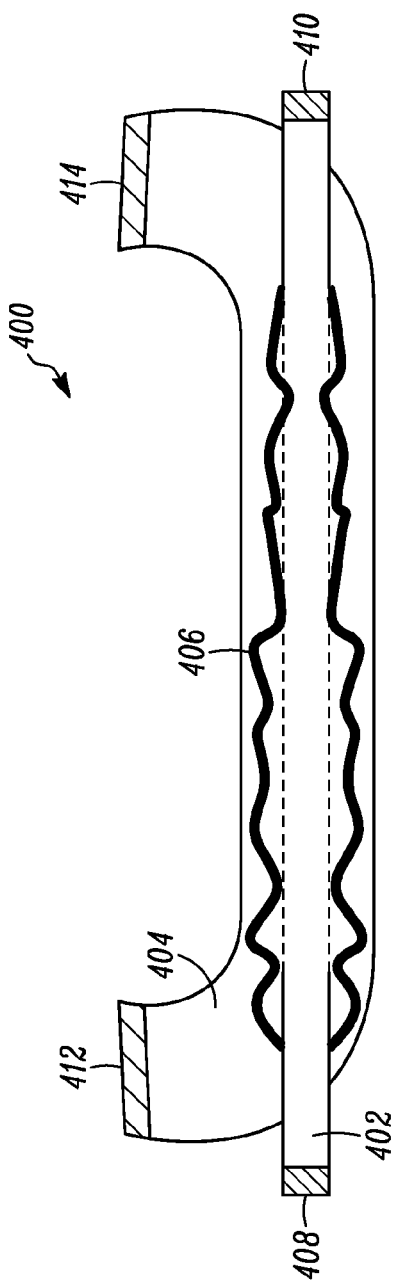
FIG. 4a is a sectional view and FIG. 4b is a cross-sectional view of one example energy recovery system, in accordance with an illustrative embodiment of the invention.

FIG. 4a is a sectional view of one example energy recovery system 400, in accordance with another illustrative embodiment of the invention. The example energy system 400 includes a sieved tube 402 enclosed in a container, such as a pressure vessel 404 of any desired shape and dimension. The sieved tube 402 and the pressure vessel 404 may have circular cross-section and may be concentric with respect to each other thus enclosing a substantial part of the sieved tube 402. Further, the tubular sieved tube 402 may receive a first fluid at low pressure, and the pressure vessel 404 may receive a second fluid at high pressure. A tubular thick diaphragm 406 is positioned between the sealed tube 402 and the pressure vessel 404 and is operable to prevent the mixing of the fluids in the sieved tube 402 and the pressure vessel 404. The tubular thick diaphragm 406 may be sealed at the end points between the sieved tube 402 and the pressure vessel 404, and may move in and out under the pressure of the fluids in the tube 402 and the pressure vessel 404. The tubular thick diaphragm 406 is further used to transmit pressure energy between the low pressure first fluid and the high pressure second fluid thereby achieving pressure energy recovery.

Further, the thickness of the diaphragm 406 is such as to amplify the transmitted pressure from the high pressure fluid to the low pressure fluid, and make the energy recovery system 400 function like a pressure intensifier. Although an increase in thickness of the diaphragm 406 increases the outer surface area of the diaphragm 406, which is in contact with the high pressure brine solution, it also decreases the inner surface area of the diaphragm 406 which is in contact with the low pressure sea-water. An approximately 2 to approximately 3 percent difference in area between the inner surface and the outer surface of the diaphragm 406 may increase the pressure in the sieved tube 402 enough to compensate for the pressure drop in the high pressure brine solution in the RO unit (not shown in figure). In certain embodiments of the invention, the tubular thick diaphragm 406 may be made of an elastic polymer such as rubber. With proper choice of material and dimension design, the tension in the elastic film material during the pumping operation also increases the fluid pressure inside the film.

Additionally, the energy recovery system 400 includes two sets of valves: a first set operable to control the inflow and outflow of the first fluid inside the sieved tube 402 and a second set of valves operable to control the inflow and outflow of the second fluid inside the pressure vessel 404. In one example operation of the energy recovery system 400, the first set of valves may further include a low pressure check valve 408 operable to control the inflow of the low pressure sea-water into the sieved tube 402 and a high pressure check valve 410 operable to control the outflow of the high pressure sea-water from the sieved tube 402. Additionally, the second set of valves may include a high pressure flow regulation valve 412 to control the inflow of the high pressure brine solution into the pressure vessel 404, and a low pressure flow regulation valve 414 to control the outflow of the low pressure brine solution from the pressure vessel 404. One or more of the plurality of valves 408-414 may be used in one or more combinations to fill and drain fluids in the sieved tube 402 and the pressure vessel 404, while transmitting pressure energy from the high pressure fluid to the low pressure fluid.

The example energy recovery system 400 with the tubular thick diaphragm 406 may be used as a pressure intensifier for reducing additional pump costs like the pump 112 shown in FIG. 1 used for pressurizing the fresh sea-water.

Figure 4B:
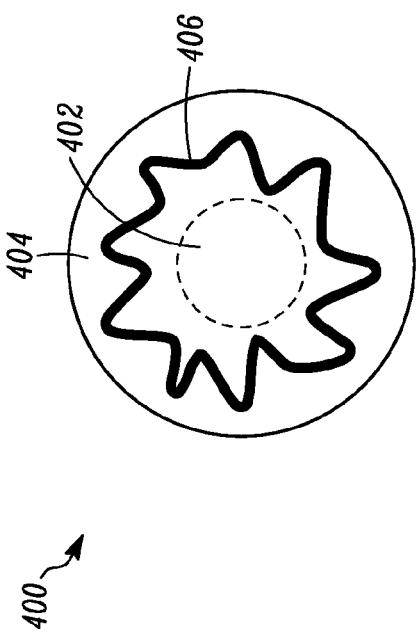

FIG. 4b is a cross-sectional view of the example energy recovery system 400 illustrated in FIG. 4a. The cross-sectional view of the example energy recovery system 400 shows the tubular sieved tube 402 and the pressure vessel 404 arranged concentric to each other, with the tubular thick diaphragm 406 positioned between the sieved tube 402 and the pressure vessel 404.

FIG. 5a is a sectional view of one example energy recovery system 500, in accordance with an illustrative embodiment of the invention. The energy recovery system 500 shown in FIG. 5a includes a first section 502 inside pressure vessel 504 operable to receive a first fluid, and a second section 506 inside pressure vessel 504 operable to receive a second fluid. The first section 502 and the second section 506 are separated with a flexible impermeable film 508. The film 508 is joined or attached, and sealed against the wall of the vessel 504 at each of the two edges. Two small perforated pipes 510 are placed on each side of the film 508 at each of the joints with the wall. In certain embodiments of the invention, the first fluid may include low pressure sea-water, while the second fluid may be a high pressure brine solution.

Additionally, the energy recovery system 500 comprises of a first set of valves 512 and 514 operable to control the inflow and outflow of the first fluid inside the first section 502 and a second set of valves 516 and 518 operable to control the inflow and outflow of the second fluid inside the second section 506. In one example operation of the energy recovery system 500, the first set of valves 512 and 514 may be check valves, and the second set of valves 516 and 518 may be flow regulation valves. One or more of the plurality of valves 512-518 may be used in one or more combinations to fill and drain fluids in the first section 502 and the second section 506 while transmitting pressure energy from the high pressure fluid to the low pressure fluid.

The example energy recovery system 500 shown in FIG. 5 operates similar to the example energy recovery system 300 shown in FIG. 3 except that the thin film or the diaphragm 508 in the energy recovery system 500 may be a thin flexible sheet instead of a flexible tube, and separates the two sections side-by-side instead of annular cylinders one-inside-the-other. The flexible part of the thin sheet 508 positioned between the first section 502 and the second section 506 moves back and forth between the two sections during the filling and pumping operations, and the volumes of the two sections are variable and determined by the positions of the thin flexible sheet 508. The thin flexible sheet 508 may transmit the pressure energy between the sea-water and the brine solution thereby achieving pressure energy recovery. In certain embodiments of the invention, the flexible sheet 508 may be made of plastics or elastic polymers, such as rubber. The small perforated pipes 510 positioned beside the thin film 508 at each of the joints against the wall prevent the film 508 from over deformation and getting over stressed during the filling and pumping operations. Moreover, the perforated pipes 510 also help to keep the seals between the film and the wall tight.

FIG. 5b illustrates a cross-sectional view of the example energy recovery system 500, in accordance with an embodiment of the invention. The cross-sectional view shown in FIG. 5b shows the first section 502 and the second section 506 are separated by the thin flexible sheet 508, and enclosed in the pressure vessel 504. The pressure vessel 504 may be of different shapes and dimensions and may not be limited to a circular cross-sectional pipe as shown in FIG. 5.

Figure 6A:
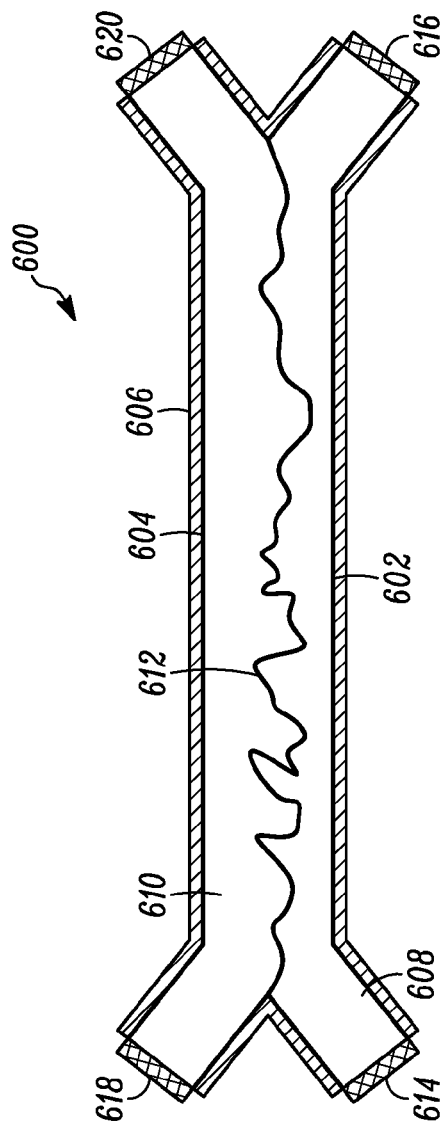
FIG. 6a is a sectional view and FIG. 6b is a cross-sectional view of one example energy recovery system, in accordance with an illustrative embodiment of the invention.

FIG. 6a is a sectional view of one example energy recovery system 600, in accordance with an illustrative embodiment of the invention. The example energy recovery system 600 includes a first flexible impermeable tube 602 and a second flexible impermeable tube 604. Each of the two flexible tubes approximately occupies the whole volume of the pressure vessel 606. The first tube 602 fills up the first section 608 of the vessel 606, and the second tube 604 fills up the second section 610 of the vessel 606. The two flexible tubes, 602 and 604 are placed partially in contact with each other, the overlapping portion of the tubes forms a flexible impermeable diaphragm 612. The flexible diaphragm 612 consists of double thin layers of the flexible tube walls of 602 and 604, and separates the two sections 608 and 610. The non-overlapping parts of the first tube 602 and the second tube 604 fill up the pressure vessel 606, while keeping the total volume constant. The first section 608 may include a first set of valves 614 and 616 operable to control the inflow and outflow of a first fluid, such as low pressure sea-water in the section 608. Further, the second section 610 may include a second set of valves 618 and 620 to control the inflow and outflow of a second fluid, such as high pressure brine solution in the second section 610. In certain embodiments of the invention, the first set of valves 614 and 616 may be check valves while the second set of valves 618 and 620 may be flow regulation valves. During filling operation and pumping operation, the flexible impermeable diaphragm 612 moves alternatively towards one of the two sections while separating the two fluids and transmitting the pressure between the two fluids, thereby making the smooth transmission of pressure energy from the high pressure fluid to the low pressure fluid, and achieving pressure energy recovery from the high pressure flow. In certain embodiments of the invention, the flexible impermeable tubes 602 and 604 may be made of plastics or elastic polymers, such as rubber.

Figure 6B:
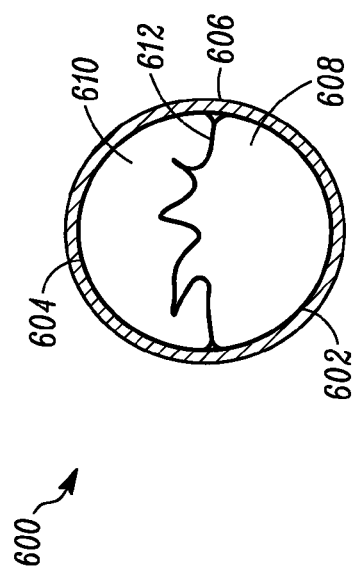

FIG. 6b illustrates a cross-sectional view of the example energy recovery system 600, in accordance with an embodiment of the invention. The cross-sectional view shown in FIG. 6b shows the first thin flexible tube 602 inside the first section 608 and the second thin flexible tube 604 inside the second section 610 placed adjacent to each other. The overlapping portion of the two tubes, 602 and 604 forms the impermeable diaphragm 612, and other portions of the two tubes are placed against the wall of the pressure vessel 606. Additionally, a small amount of fluid may be added between the two flexible tubes and between the tubes and the vessel wall to increase the adhesion between the overlapped flexible layers of the diaphragm, and the adhesion of the tubes to the vessel wall. This reduces any possible frictions due to the micro deformation during the operation.

Compared to the example energy recovery system 500 shown in FIG. 5, this example energy recovery system 600 shown in FIG. 6 eliminates the need for a seal as the two fluids flow separately inside the first tube 602 and the second tube 604. The arrangement also eliminates any mixing between the two fluids and naturally places an impermeable layer 614 between the fluids and the vessel wall. This eliminates or significantly reduces the corrosion issue of the two fluids against the vessel wall over long term usage and thus extends the operation life. Further the energy recovery system 600 with lesser moving sections than conventional energy recovery systems may result in greater reliability. More specifically, the system has no rotating sections, which eliminates the problem of system failure due to fouling. Further, the design of the energy recovery system 600 allows no change in the flow direction of either of the two fluids along the length of the energy recovery system 600, thus reducing water hammer and minimizing losses.

Figure 7:
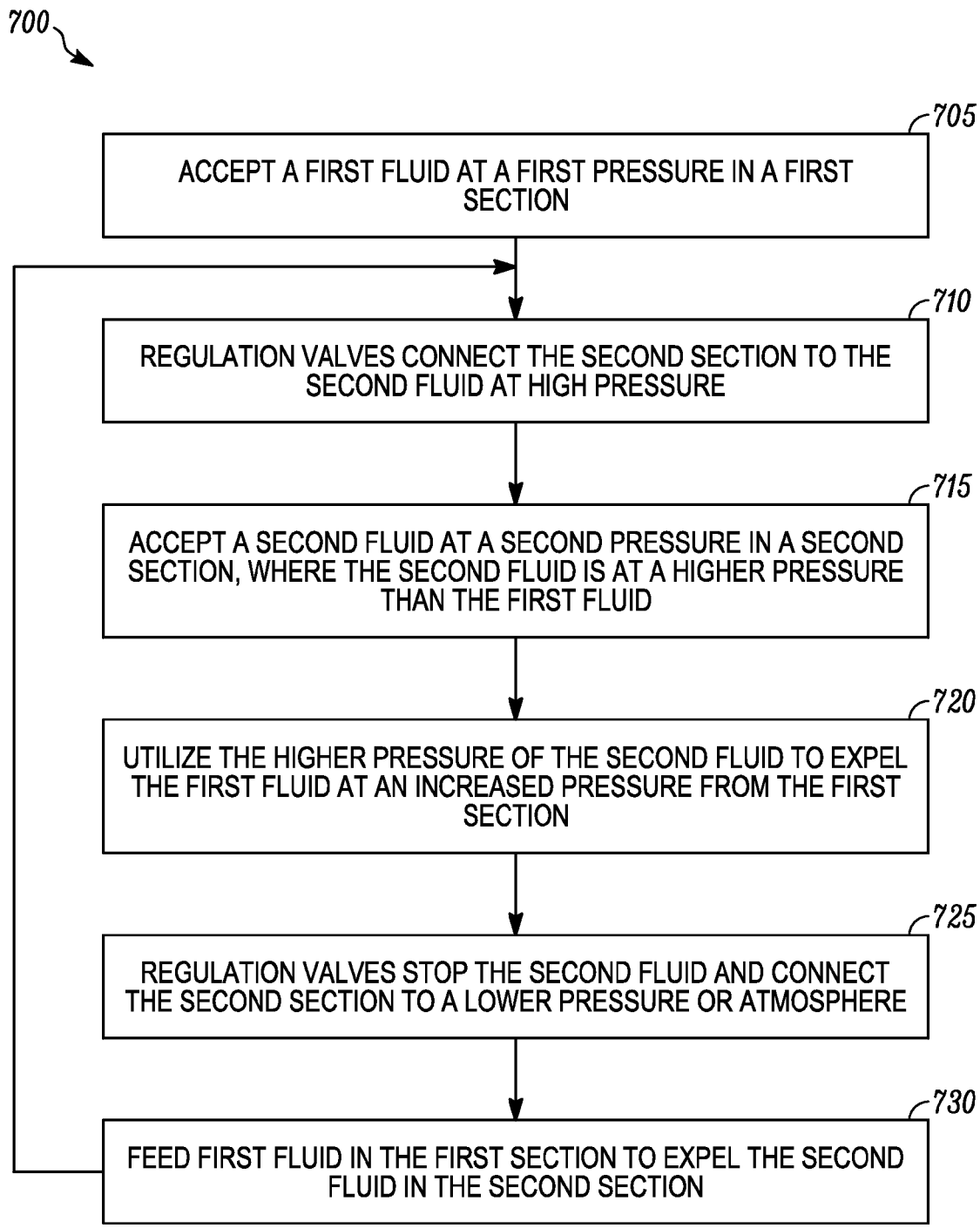
FIG. 7 is a flowchart illustrating one example of a method for energy exchange in one example energy recovery system, in accordance with an illustrative embodiment of the invention.

FIG. 7 is a flowchart illustrating one example of a method 700 for energy exchange in one example energy recovery system, in accordance with an illustrative embodiment of the invention. The method 700 may broadly involve two operations—a filling operation and a pumping operation, one following the other cyclically.

The method 700 may begin at block 705. At block 705, a first fluid may be accepted at a first pressure in a first section (initial filling operation). An energy recovery system comprises a first section and a second section separated by an impermeable diaphragm. The first section includes a first set of valves to control the inflow and outflow of a first fluid, such as sea-water in the first section. In one example filling operation of the energy recovery system, the first set of valves may include a low pressure check valve operable to control the inflow of the low pressure first fluid into the first section during the filling operation and a high pressure check valve operable to control the outflow of the high pressure first fluid from the first section during the pumping operation. Following the receiving of the first fluid at a first pressure in a first section at block 705, operations may proceed to block 710.

At block 710, regulation valves connect the second section to the second fluid at high pressure. Block 710 constitutes the initial step of the pumping operation in the energy recovery system. The second section of the energy recovery system comprises a second set of valves to control the inflow and outflow of a second fluid, such as concentrated brine solution in the second section. In an example pumping operation of the energy recovery system, the second set of valves may include a high pressure flow regulation valve operable to control the inflow of the high pressure second fluid into the second section during pumping operation and a low pressure flow regulation valve operable to control the outflow of the second fluid from the second section during filling operation. After connecting the second section to high pressure fluid, as shown in block 715, the second fluid may be accepted at high pressure in a second section of the energy recovery system, where the second fluid is at a higher pressure than the first fluid. In the meanwhile of operation in block 715, operation in block 720 also happens.

At block 720, the higher pressure of the second fluid is utilized to expel the first fluid at an increased pressure from the first section, which is essentially the pressure of second fluid. Block 720 constitutes the concluding step of the pumping operation in the energy recovery system. During the pumping operation, the check valve operable to control the outflow of the first fluid and the flow regulation valve operable to control the inflow of the second fluid may remain open. Additionally the check valve operable to control the inflow of the first fluid and the flow regulation valve operable to control the outflow of the second fluid may be maintained closed. The pumping operation further involves exerting the high pressure second fluid in the second section to the first fluid in the first section, which was at low pressure before the pumping operation, and subsequent removal of the first fluid from the first section of the energy recovery system. During this operation, the high pressure second fluid which flows into the second section may thus squeeze the flexible diaphragm causing it to contract. Consequently, the diaphragm in turn may compress the first fluid in the first section to the high pressure. Thereafter the pressurized first fluid may flow out from the first section. Thus blocks 715 and 720 constitute the pumping operation of the energy recovery system. Following the outflow of the first fluid from the first section, operations may proceed to block 725.

At block 725, the regulation values stop the second fluid, and connect the second section to a lower pressure than the first fluid pressure or to the atmosphere. The operation comes to block 730, the first fluid may be fed in the first section to expel the second fluid in the second section. Block 730 constitutes the filling operation of the energy recovery system. Following filling operation, operations may return to block 710 and the blocks may be repeated cyclically.

Embodiments of the invention may be applicable to different filtration processes and may not be limited to only desalination systems, such as a reverse osmosis system. The example embodiments of the energy recovery system described in reference with FIGS. 2-7 may be efficient than conventional energy recovery schemes. The invention reduces the amount of fluid flowing through high pressure pumps by utilizing the pressure energy latent in the concentrated brine solution, thus increasing the efficiency of the system. The invention may further increase efficiency by minimizing losses due to friction and mixing of the two fluids, and may reduce/eliminate the frequent replacements of the components of the system. Further the illustrated energy recovery system with lesser moving sections than conventional energy recovery systems may result in greater reliability. More specifically, the system has no rotating sections, eliminating the problem of system failure due to fouling. Further, the design of the energy recovery system allows no change in the flow direction of either of the two fluids along the length of the energy recovery system, thus reducing water hammer and minimizing losses. It will be apparent that any example taken/provided in the foregoing specification is merely provided for explanation purposes and does not limit the scope of the invention by any means.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for a pressure exchange, the method comprising:
   a) accepting a first fluid in a first section;
   b) accepting a second fluid in a second section, wherein the second fluid is at a higher pressure than the first fluid;
   c) utilizing the higher pressure of the second fluid to expel the first fluid at an increased pressure from the first section, wherein the first section and the second section are separated by at least one flexible impermeable diaphragm;
   d) feeding the first fluid in the first section, wherein the pressure of the first fluid is utilized to expel the second fluid from the second section via a low pressure flow regulation valve; and
   e) keeping the flow of the first fluid and the second fluid by repeating the steps b) to d) cyclically;
   f) maintaining the continuous flow of the two fluids by coordinating a plurality units of such system.

2. The method of claim 1 further comprises controlling an inflow of the first fluid into the first section and an outflow of the second fluid from the second section during the above steps.

3. The method of claim 1 further comprises controlling an inflow of the second fluid into the second section and an outflow of the first fluid from the first section during the above steps.

4. The method of claim 1, wherein the first section may comprise a sieved tube.

5. The method of claim 1, wherein the pressure exchange method is employed in an energy recovery process of a water treatment unit.

* * * * *